United States Patent Office 3,141,051
Patented July 14, 1964

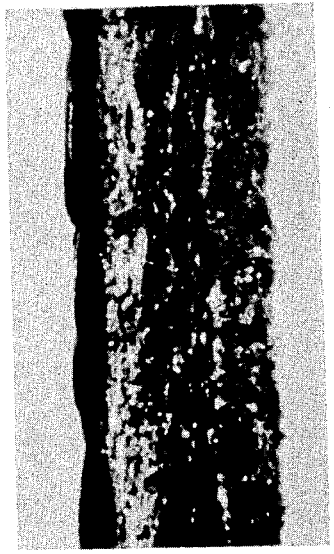
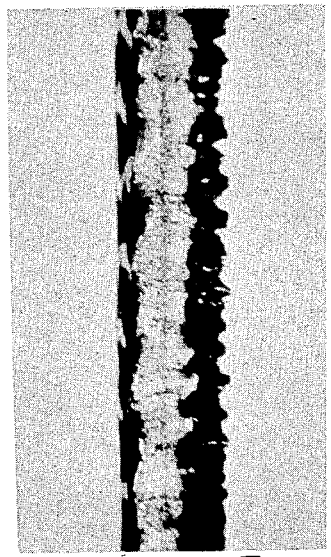
Fig. 1.  36X Magnification  Fig. 2.
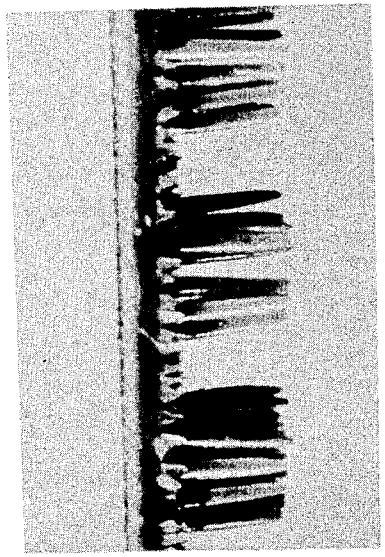
12X Magnification
Fig. 3.
8X Magnification
Fig. 4.
Inventor
UNOKICHI TAKAI
By Lester W. Clark
Attorney

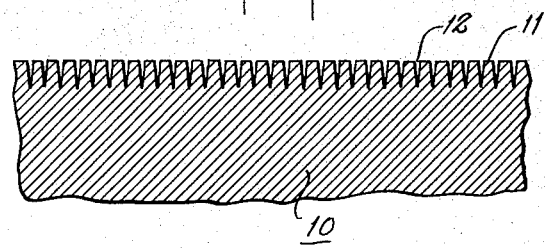
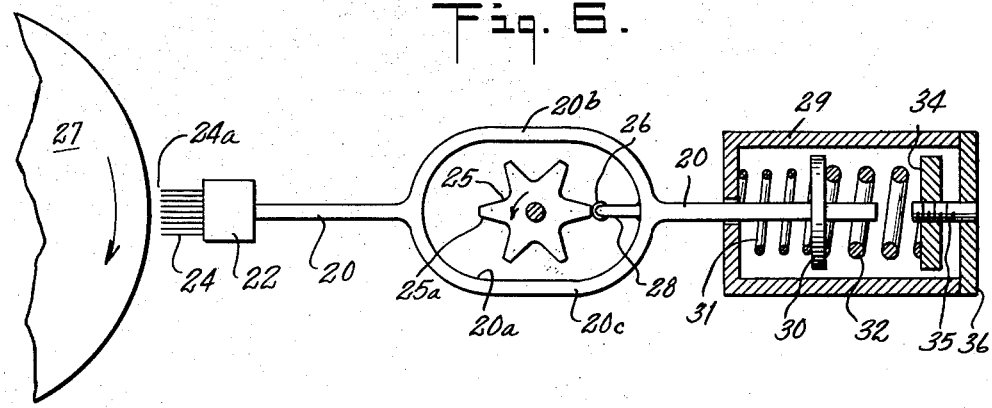
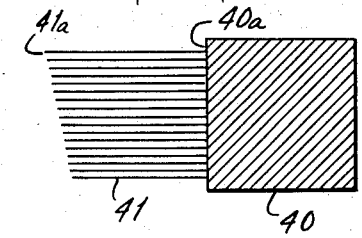
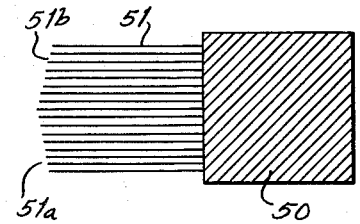

3,141,051
METHOD AND APPARATUS FOR PREPARING SPECIAL SURFACE FINISHES
Unokichi Takai, Kofu, Yamanashi-ken, Japan, assignor to Elm Coated Fabrics Company, Inc., Brooklyn, N.Y., a corporation of New York
Filed Sept. 14, 1960, Ser. No. 56,036
19 Claims. (Cl. 264—219)

This invention relates to the preparation of special surface finishes for plastic materials and the like and apparatus useful in the preparation thereof. More particularly, this invention relates to the preparation of plastic materials, such as vinyl plastic materials, having special surfaces.

It has been a long sought goal to prepare synthetic or plastic materials having the touch and feel of natural materials such as fur, suede and the like. Various techniques have been proposed heretofore for the preparation of such materials. For example, it has been proposed to treat or brush the surface of relatively smooth plastic material to roughen the surface thereof to create a soft, cushiony surface. It has also been proposed to coat the surface of a smooth plastic material with an adhesive and then to dust finely-divided fibrous material thereon to create a soft, fur-like, warm finish. It has also been proposed to coat the surface of a smooth plastic material with a film containing a foaming agent so as to form on the coated surface a film of porous, foamed plastic material having a soft, warm feel. Various other techniques have also been proposed in an effort to cause synthetic materials to simulate natural materials. For the most part, however, the techniques proposed heretofore have not been successful on a commercial scale due not only to the expense involved but, more frequently, also due to the fact that the resulting materials did not satisfactorily simulate the natural material or surface sought to be simulated.

It is an object of this invention to provide an apparatus useful in the preparation of special finishes for synthetic or plastic surfaces.

It is another object of this invention to provide an apparatus useful in the preparation of synthetic or plastic materials which simulate natural materials.

Still another object of this invention is to provide a method employing such apparatus for the production and/or preparation of simulated natural materials.

Yet another object of this invention is to provide a method for the preparation of a tool or apparatus useful in the treatment of surfaces of synthetic or plastic materials for the preparation of special finishes on the surfaces thereof.

How these and other objects of this invention are accomplished will become apparent in the light of the accompanying disclosure made with reference to the accompanying drawings wherein:

FIG. 1 is a photomicrograph of a cross-section of natural suede;

FIG. 2 is a photomicrograph of a cross-section of a suede-like plastic material prepared in accordance with this invention;

FIGS. 3 and 4 are photomicrographs of cross-sections of synthetic plastic materials specially treated and prepared in accordance with this invention;

FIG. 5 is a greatly enlarged, fragmentary, cross-sectional view of an embossing tool useful in the practice of this invention;

FIG. 6 illustrates an apparatus or machine in accordance with this invention useful for the preparation of an embossing tool, such as the type illustrated in FIG. 5, employed in the practice of this invention; and wherein FIGS. 7 and 8 are cross-sectional views of special piercing tools employed in the practice of this invention for the preparation of embossing tools useful in the preparation of special finishes on plastic surfaces.

It has been determined that synthetic or plastic materials simulating or possessing the outward appearance and feel of natural materials, such as suede and fur, can be prepared by pressing the relatively soft surface of a synthetic or plastic material, such as vinyl resin, into contact with a relatively hard embossing surface of an embossing tool provided with a plurality of holes extending part of the way into said embossing tool. The pressing or embossing operation is carried out under conditions, usually a combination of heat and pressure, such that as the relatively soft synthetic or plastic material is pressed into contact with the embossing surface the plastic material is caused to flow into the holes provided on the embossing surface to substantially completely fill these holes. After the plastic material has been thus pressed into the holes on the embossing surface, the embossing surface is removed from contact with the resulting embossed plastic material, such as by simply lifting or stripping the embossed material away from the embossing surface. After removal the resulting embossed plastic material now has created on the surface thereof a plurality of separate fibers extending outwardly from the surface thereof and integral with and made of the same material as said plastic material. Depending upon the density of holes and the depth and size of the holes on the embossing surface, a great variety of natural-like materials can be produced, ranging from suede-like and fur-like materials useful as wearing apparel to somewhat rough, bristly materials useful as a flooring surface or a decorative surface.

The special surfaces prepared in accordance with the practice of this invention impart a different appearance, touch, feel and other characteristics to the finished article depending upon the size and density of the fibers formed on the surface thereof. For example, to impart a soft, warm, suede-like feel and appearance to a synthetic plastic material, such as a sheet of vinyl plastic, the vinyl plastic material is treated and embossed so as to form on the surface thereof a very large number of relatively small fibers or fibriles in the manner described hereinabove. The fibers have a length, as measured from the base of the fiber to the end thereof, in the range 0.002–0.01 inch, more or less, and have a diameter, measured from the base, in the range 0.002–0.01 inch, the fibers being present on the embossed surface at a density in the range 12,000–25,000, more or less, fibers per square inch. When a synthetic or soft plastic material is prepared as described herein having the above fiber characteristics, a synthetic suede-like material is produced.

If other materials not necessarily suede-like in appearance but more fur-like or bristly in appearance are desired, the fiber length and diameter should be greater, such as a fiber length in the range 0.1–0.5 inch and a diameter as measured at the base of the fiber in the range 0.05–0.2 inch, the fiber density being in the range 200–5000 per square inch, more or less.

Referring now to the drawings, FIG. 1 is a photomicrograph of a cross-section of natural suede. It is to be noted, as indicated in FIG. 1, that the surface of the natural suede material illustrated therein is made up of what appears to be matted fibers in a relatively flat position with respect to the underlying body of suede material. These matted fibers give a brushed appearance to the suede material and impart a soft, cushiony feel to the surface thereof. As is known, natural suede presents an attractive, dull, non-lustrous, non-reflecting surface but which tends to show dirt or other extraneous material on the surface thereof very readily and requires constant attention, care and brushing in order to be maintained in a clean, pleasing appearance. Since natural suede material is an animal hide product, caution must be exercised in maintaining and cleaning this material.

Referring now to FIG. 2 of the drawings, there is shown therein a photomicrograph of a cross-section of a synthetic or plastic suede-like material prepared in a manner disclosed herein. It is to be noted that the fibers extending upwardly from the underlying body of plastic material, actually a sheet of vinyl plastic, are self-supporting and are generally conically shaped, the fibers extending substantially directly upward from the surface of the vinyl plastic material. The surface presented by the specially prepared material illustrated in FIG. 2 is, like natural suede, attractive, soft, warm, and pleasing in appearance and substantially non-lustrous and non-light reflecting. Additionally, folds, or creases on this plastic surface tend to show up due to light being reflected by the side surfaces of the individual fibers projecting from the surface, thereby creating attractive highlights. Since the material employed in the manufacture of a suede-like material indicated in FIG. 2 may be any synthetic or plastic material, such as vinyl plastic or other suitable material such as polyethylene, polypropylene, polyvinyl acetate, polystyrene, etc. which materials are substantially fluid or liquid impermeable and resistant to water and to most chemicals and solvents such as gasoline, carbon tetrachloride, alcohol, water, etc., substantially any ordinary solvent can be employed to clean or remove stains from the surface of this synthetic suede-like material. Additionally, since the fibers thereon are integral with and made of the same material as the underlying plastic material itself and not mechanically attached thereto, the synthetic suede-like material can withstand vigorous scrubbing or brushing with substantially little danger of pulling away the fibers. Suede-like materials of the type illustrated in FIG. 2 are particularly useful in the manufacture of rainwear, such as raincoats, and footwear, such as rubbers and galoshes as well as the manufacture of accessories, such as handbags, gloves, hats, decorative material, etc.

Referring now to FIG. 3 of the drawings, which is a photomicrograph of a cross-section of an embossed synthetic material prepared as disclosed herein, the material illustrated therein contains fibers of generally greater length and size than the fibers of the material illustrated in FIG. 2. The fibers are arranged in a pattern wherein groups of relatively long and relatively large fibers are separated by groups of relatively short, relatively small fibers, such as fibers of the dimensions and type illustrated in FIG. 2. FIG. 3 indicates that various patterns and decorative effects may be obtained on embossed surfaces in accordance with the practice of this invention by varying the size of the fibers embossed thereon and/or by providing thereon groups of fibers of varying length in a pattern or randomly.

Referring now to FIG. 4 of the drawings which is a photomicrograph of a cross-section of an embossed synthetic plastic material such as vinyl plastic, the fibers illustrated therein are generally of greater length and size than the fibers illustrated in FIGS. 2 and 3. More particularly, the fibers illustrated in FIG. 4 may have a length in the range 0.10–0.25 inch and a fiber diameter measured at the base of the fiber in the range 0.02–0.2 inch. The fiber density of the fibers illustrated in FIG. 2 is much less than the fiber density of the materials illustrated in FIGS. 2 and 3, being in the range 100–750 fibers, more or less, per square inch. The embossed material illustrated in FIG. 4 is particularly useful as decorative material, floor covering and the like.

Referring now to FIG. 5 of the drawings, there is illustrated therein on an enlarged scale a fragmentary cross-sectional view of an embossing tool prepared in accordance with this invention. As indicated in FIG. 5, a body 10 of relatively soft metallic material is pierced on the surface 11 thereof with a plurality of holes 12 extending part of the way into the soft, metallic body, such as a lead-containing alloy, e.g., lead-antimony alloy containing a major amount of lead, about 75–85% by weight and a minor amount of antimony, about 25–15% by weight. The holes 12 are illustrated as being substantially conical in shape but may be cylindrical in shape or triangular or square in shape (cross-section) or any other suitable shape or cross-section depending upon the method employed to form the holes 12 on the embossing tool 10.

Referring now to FIG. 6 of the drawings, there is illustrated therein, somewhat schematically, an apparatus useful for the preparation of an embossing tool, such as an embossing tool having an embossing surface illustrated in FIG. 5, useful in the preparation of the special synthetic materials described herein. As illustrated in FIG. 6 a shaft 20 provided with an opening 20a extending therethrough between shaft segments 20b and 20c, has mounted or fixed to one end thereof a piercing tool 22. Piercing tool 22 has fixed at the forward end thereof, axially with respect to shaft 20, a plurality of relatively hard piercing members 24, the ends 24a of which are sharp and needle-like. Although the piercing members 24 may be made of any suitable, substantially rigid material such as steel needles or nails or even of material having a relatively blunt end or point, it is preferred to employ for piercing members 24 piano wires which have been drawn to a point and sharpened at one end and clipped at the other end. Piano wire has been found to be suitable as a piercing member in accordance with this invention since, although substantially rigid, it is quite flexible and in the event a piercing member made of piano wire strikes the edge of a hole already formed on the surface of an embossing tool a piercing member made of piano wire tends to be readily guided into the hole and makes the hole thus entered deeper rather than marring the side of the hole or forming a new hole on the edge of the previously formed hole.

As indicated in FIG. 6, the embossing tool or roll 27 shown therein in cross-section is cylindrical in shape with the result that since all the ends of piercing members 24a lie in the same plane only certain of the piercing members 24a initially pierce the surface of embossing roll 27, the remaining piercing members then subsequently piercing the surface of the embossing roll. As a result the initially formed holes are deeper than the subsequently formed holes.

There is provided within opening 20a of shaft 20 star gear 25 which is adapted by suitable means such as an electric motor, not shown, for rotation therein. Cam surface 26 makes contact with the star gear 25 and follows the periphery or contour of star gear 25 as it is rotated. Cam 26 is carried on a projection or extension 28 of shaft 20 and extends axially thereof within opening 20a. The other end of shaft 20 is positioned within housing 29. That portion of shaft 20 within housing 29 is fitted with a flange 30. Positioned on either side of flange 30 are springs 31 and 32. Spring 31 is positioned on that side of flange 30 in the direction of piercing tool 22 and is rather a light spring whereas spring 32 is positioned on the other side of flange 30 and is rather a heavy, strong spring. Adjusting nut 34 is threadedly engaged to projecting member 35 carried by cover plate 36 fixed to housing 29 and serves as adjusting means for adjusting and positioning spring 32 within housing 29 between flange 30 and cover plate 36.

In the operation of the apparatus illustrated in FIG. 6, embossing roll 27 is relatively slowly rotated as star gear 25 is rotated. Since cam 26 bears upon and is in contact with star gear 25, cam 26 together with shaft 20 and piercing tool 22 carried thereon is forced backwardly against spring 32 as star gear 25 is rotated. Upon continued rotation of star gear 25 the teeth 25a thereof are turned clear of cam 26 with the result that shaft 20 is no longer restrained by teeth 25a for forward movement under the urging of spring 32. Accordingly, when cam 26 is uncovered shaft 20 is urged forward by spring 32 with the result that piercing members 24 carried by piercing tool 22 fixed to shaft 20 are moved forward to contact the surface of embossing roll 27 to form holes therein. The depth at which the holes are formed within the surface of embossing roll 27, assuming an embossing roll made of a material having a hardness less than that of the piercing members 24, is dependent upon the energy available from spring 32 when it first causes shaft 20 to move forward. The maximum penetration of piercing members 24 into embossing roll 27 is dependent upon the free travel distance between cam 26 just as it clears star gear 25 until it again contacts star gear 25 at the base or root of teeth 25a. Upon continued rotation star gear 25 again moves cam 26 together with shaft 20 backwards against spring 32. Accordingly, rotation of star gear 25 causes shaft 20 and piercing tool 22 to move repetitively forwards and backwards. By rotating embossing roll 27 and star gear 25 as described hereinabove and by moving embossing roll 27 and piercing tool 22 sidewise relative to each other the surface of embossing roll 27 can be completely pierced.

In the practice of the embodiment of this invention illustrated in FIG. 6 a cylindrical embossing roll is employed. When a flat embossing plate is employed it is desirable that the piercing tool 22 be replaced with a piercing tool of the type illustrated in FIGS. 7 or 8. In FIG. 7 there is shown a piercing tool 40 provided with piercing members 41, the ends 41a which all lie in an inclined plane, such as a plane inclined with respect to face 40a of tool 40 so that when piercing tool 40 is employed in the apparatus illustrated in FIG. 6 to form holes on a flat, planar embossing member or plate disposed parallel with respect to face 40a of piercing tool 40 only a portion of piercing members 41 carried by piercing tool 40 initially contact and penetrate the embossing plate, the other piercing members subsequently contacting and penetrating the plate. Substantially the same results can be achieved by employing the piercing tool 22 and members 24 of FIG. 6 if the plate is not disposed parallel to the ends 24a of members 24.

The same results are also achieved by employing the piercing tool 50 shown in FIG. 8 wherein the piercing tool 50 is provided with piercing members 51, the sharpened ends of which all do not lie in the same plane and wherein, as illustrated, a portion of the ends 51a lie in one plane and another portion 51b lie in another plane inclined with respect to the first mentioned plane of ends 51a, the ends 51a and 51b defining an angular or wedge shape piercing tool.

In the practice of this invention, particularly in connection with the manufacture of suede-like materials wherein the fiber density is in the range 15,000–25,000 fibers per square inch, more or less, it has been found to be difficult to fabricate piercing members having wires or sharpened ends fitted and fixed together in the above density. Generally, a piercing tool employed in the practice of this invention contains the shank ends of the piercing members closely, substantially solidly, packed together and soldered or otherwise fixed within the body of the piercing tool. Accordingly, in accordance with one feature of this invention it has been found that satisfactory results are obtained if during the manufacture of the embossing tool overlapping of the piercing members during contact with the surface of the embossing tool is obtained so that, although the piercing member density may be substantially less than of the fiber density desired in the finished material or the hole density on the surface of the embossing tool, the desired hole and corresponding fiber density is obtained by repetitively piercing a given area of the embossing tool with the piercing tool. For example, employing a piercing member having only about 8000 piercing members per square inch, by repetitively piercing a given surface area on the embossing tool the hole density therein can be increased with respect to the piercing member density at least three fold, about 25,000 holes per square inch. Higher and lower hole densities, and accordingly, fiber densities can be obtained depending not only upon the number of piercing members per square inch on the working face of the piercing tool but also upon the number of times a given area on the surface of the embossing tool is repetitively pierced under conditions such that the repetitive piercing operation does not serve only to enlarge or deepen previously formed holes therein, i.e., when the first group of holes is formed on the embossing surface the piercing members are displaced relative to these holes so that when the piercing members come in contact with the surface of the embossing tool a substantial number of new holes are created rather than only enlarging the previously formed holes.

The practice of this invention is applicable to the creation of special surfaces having projecting fiber contours on any relatively soft surface capable of being embossed as described herein. The practice of this invention, however, is particularly applicable to synthetic thermoplastic materials, particularly vinyl plastic, supported or unsupported. Such materials as sheet rubber and other related or similar materials are also suitably treated in accordance with the practice of this invention.

Many modifications, changes and alterations are possible in the practice of this invention and will suggest themselves to those skilled in the art in the light of the foregoing disclosure without departing from the spirit or scope of this invention.

I claim:

1. A method of preparing an embossing tool to provide on the surface thereof a plurality of holes extending only part of the way downwardly from said surface into said tool which comprises repetitively moving the surface of said embossing tool to be pieced relative to a piercing tool provided with a plurality of needle-like piercing members thereon so that the surface of said embossing tool is pierced by said needle-like members, said surface of said embossing tool being positioned relative to said piercing tool such that upon contact of said surface with said piercing tool only part of said piercing members thereon initially pierce said surface, said embossing tool being pierced more deeply by said piercing tool at that location wherein said piercing members first come into contact with the surface of said embossing tool and said embossing tool being pierced less deeply by said piercing members at those locations on the surface of said embossing tool which subsequently come into contact with said piercing members, the density of said needle-like piercing members provided on said piercing tool being less than the density of the holes on the surface of said embossing tool.

2. A method in accordance with claim 1 wherein the surface of said embossing tool is cylindrical.

3. A method in accordance with claim 1 wherein the surface of said embossing tool is cylindrical and wherein the ends of said needle-like piercing members which pierce the surface of said embossing tool to form holes therein all lie in substantially the same plane.

4. A method in accordance with claim 1 wherein the surface of said embossing tool to be pierced is planar.

5. A method in accordance with claim 1 wherein the surface of said embossing tool to be pierced is substantially planar and wherein the ends of said piercing members employed to pierce the surface of said embossing tool lie in a plane disposed at an angle with respect to the planar surface of the embossing tool.

6. A method in accordance with claim 1 wherein the ends of the needle-like piercing members employed to pierce the surface of the embossing tool are arrayed such that these ends do not lie in the same plane.

7. A method in accordance with claim 1 wherein the ends of the needle-like piercing members employed to pierce the surface of the embossing tool are arrayed in a wedge shape.

8. A method in accordance with claim 1 wherein the surface of said embossing tool to be pieced is non-planar.

9. A method in accordance with claim 1 wherein the surface of said embossing tool to be pierced is non-planar and wherein the ends of said needle-like piercing members which pierce the surface of said embossing tool to form holes therein all lie in substantially the same plane.

10. A method in accordance with claim 1 wherein said embossing tool is made of a lead-containing alloy.

11. A method in accordance with claim 1 wherein said embossing tool is made of a relatively soft lead-containing alloy comprising a major amount of a lead and a minor amount of another metallic element.

12. A method in accordance with claim 11 wherein said other metallic element is antimony.

13. A method in accordance with claim 1 wherein said needle-like piercing members comprise piano wire drawn to a point and sharpened to present a needle-like end to contact and pierce the surface of said embossing tool.

14. A method of preparing a suede-like finish on a synthetic plastic surface which comprises repetitively moving the surface of an embossing tool to be pierced relative to a piercing tool provided with a plurality of needle-like piercing members disposed thereon so that only a portion of said needle-like piercing members pierce the surface of said embossing tool when said piercing tool first comes into contact therewith, to pierce the surface of said embossing tool, said surface being pierced more deeply by said piercing tool at that location wherein said piercing members first come into contact with the surface of said embossing tool and said surface being pierced less deeply by said piercing members at that location on the surface of said embossing tool which subsequently comes into contact with other piercing members of said piercing tool, thereby providing on the surface of said embossing tool a plurality of holes extending only part of the way downwardly from said surface into said tool, the density of said holes on said surface being in the range 15,000–25,000 per square inch and being greater than the density of said needle-like piercing members provided on said piercing tool, said holes having a depth in the range 0.005–0.15 inch and a diameter on the surface of said embossing tool in the range 0.002–0.02 inch, pressing a surface of a vinyl sheet material into contact with the aforesaid pierced surface of said embossing tool at a pressure and for a period of time sufficient to cause said vinyl sheet material to flow into the holes thus-provided in said embossing tool to form on the thus-pressed surface of said vinyl sheet material a plurality of separate fibers integral with said vinyl sheet material, the density, depth and size of said fibers thus-formed substantially corresponding to the density and size of the holes provided on the surface of said embossing tool and removing the resulting embossed vinyl sheet material from contact with said embossing tool.

15. A method of preparing a special finish on the surface of a relatively soft yieldable material which comprises repetitively moving the surface of an embossing tool to be pierced relative to a piercing tool provided with a plurality of needle-like piercing members disposed thereon so that only a portion of the needle-like piercing members pierce the surface of said embossing tool when said piercing tool first comes into contact therewith to pierce the surface of said embossing tool, said surface being pierced more deeply by said piercing tool at that location wherein said piercing members thereof first come into contact with the surface of said embossing tool and said surface being pierced less deeply by said piercing members at that location on the surface of said embossing tool which subsequently comes into contact with other piercing members of said piercing tool, thereby providing on the surface of said embossing tool a plurality of holes extending only part of the way downwardly from said surface into said tool, the density of said holes on said surface being greater than the density of said needle-like piercing members provided on said piercing tool, pressing a surface of said relatively soft material into contact with the aforesaid pierced surface of said embossing tool at a pressure and for a period of time sufficient to cause said material to flow into the holes thus-provided in said embossing tool to form on the thus-pressed surface of said material a plurality of separate fibers extending outwardly from said surface and integral with said material, the density, depth and size of fibers thus-formed substantially corresponding to the density and size of the holes provided on the surface of said embossing tool and removing the resulting embossed material from contact with said embossing tool.

16. A method in accordance with claim 15 wherein said relatively soft material is a sheet of vinyl plastic.

17. A method in accordance with claim 16 wherein said sheet of vinyl plastic is an unsupported sheet of vinyl plastic.

18. A method in accordance with claim 15 wherein said pressing operation is carried out at an elevated temperature to soften said plastic material.

19. A method in accordance with claim 15 wherein said material is a synthetic thermoplastic material.

References Cited in the file of this patent

UNITED STATES PATENTS

| | | |
|---|---|---|
| 315,636 | King | Apr. 14, 1885 |
| 1,051,752 | Noyes | Jan. 28, 1913 |
| 1,057,011 | Sargent | Mar. 25, 1913 |
| 1,784,866 | Fahrenwald | Dec. 16, 1930 |
| 1,957,732 | Rowe | May 8, 1934 |
| 2,068,456 | Hooper | Jan. 19, 1937 |
| 2,193,231 | Gibbons | Mar. 12, 1940 |
| 2,318,111 | Steinberger | May 4, 1943 |
| 2,503,539 | Aspeek | Apr. 11, 1950 |
| 2,504,090 | Sanderson | Apr. 11, 1950 |
| 2,609,568 | Getchell | Sept. 9, 1952 |
| 2,617,223 | McElroy et al. | Nov. 11, 1952 |
| 2,623,591 | Furnald | Dec. 30, 1952 |
| 2,699,077 | Bedker | Jan. 11, 1955 |
| 2,703,993 | Staggers | Mar. 15, 1955 |
| 2,715,846 | Grop et al. | Aug. 23, 1955 |
| 2,861,371 | Leshik | Nov. 25, 1958 |
| 2,924,863 | Chavannes | Feb. 16, 1960 |
| 2,925,625 | Souza | Feb. 23, 1960 |
| 3,110,141 | Dalgleish | Nov. 12, 1963 |